United States Patent

[11] 3,550,516

| [72] | Inventor | Henry J. Koeber, Jr. Deerfield, Ill. |
|---|---|---|
| [21] | Appl. No. | 735,231 |
| [22] | Filed | June 7, 1968 |
| [45] | Patented | Dec. 29, 1970 |
| [73] | Assignee | Bell & Howell Company Chicago, Ill. a corporation of Illinois |

[54] CAMERA FOCUSING MECHANISM USING TRIANGULATION PRINCIPLE
8 Claims, 4 Drawing Figs.

[52] U.S. Cl. ..................................... 95/44, 350/46; 352/139
[51] Int. Cl. ....................................................... G03b 3/00
[50] Field of Search .................................... 95/44, 45; 353/101; 355/58; 352/140, 139; 350/41, 46

[56] References Cited
UNITED STATES PATENTS
| | | | |
|---|---|---|---|
| 2,456,317 | 12/1948 | Rabinow ..................... | 352/140X |
| 2,955,518 | 10/1960 | Perry ............................ | 350/187X |

*Primary Examiner*—John M. Horan
*Assistant Examiner*—Richard L. Moses
*Attorney*—William F. Pinsak and John E. Peele, Jr.

ABSTRACT: The "in focus" position of an objective which is adjustable longitudinally of its optical axis by rotation is determined by a pendulous range-finding cam which is freely swingable from a camera when the objective is in an unfocused condition. To condition the cam for focusing the objective, the base of a subject is sighted with the camera from a camera-operating position and thereafter the cam is releasably secured from rotation. The objective is then rotated for axial adjustment and to axially drive a spacer rod into engagement with said cam for stopping the objective at its "in focus" position.

PATENTED DEC 29 1970 3,550,516
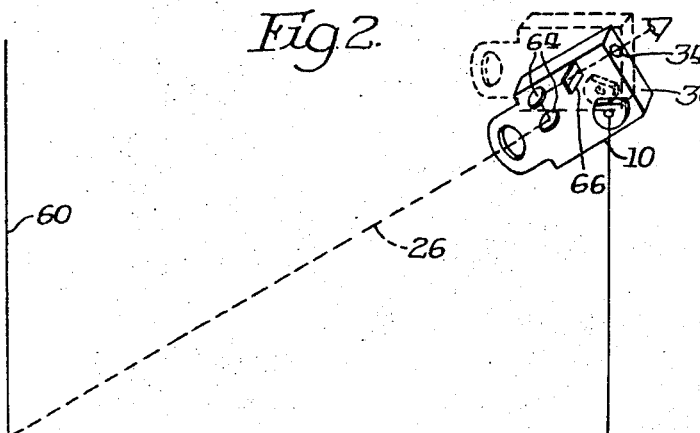
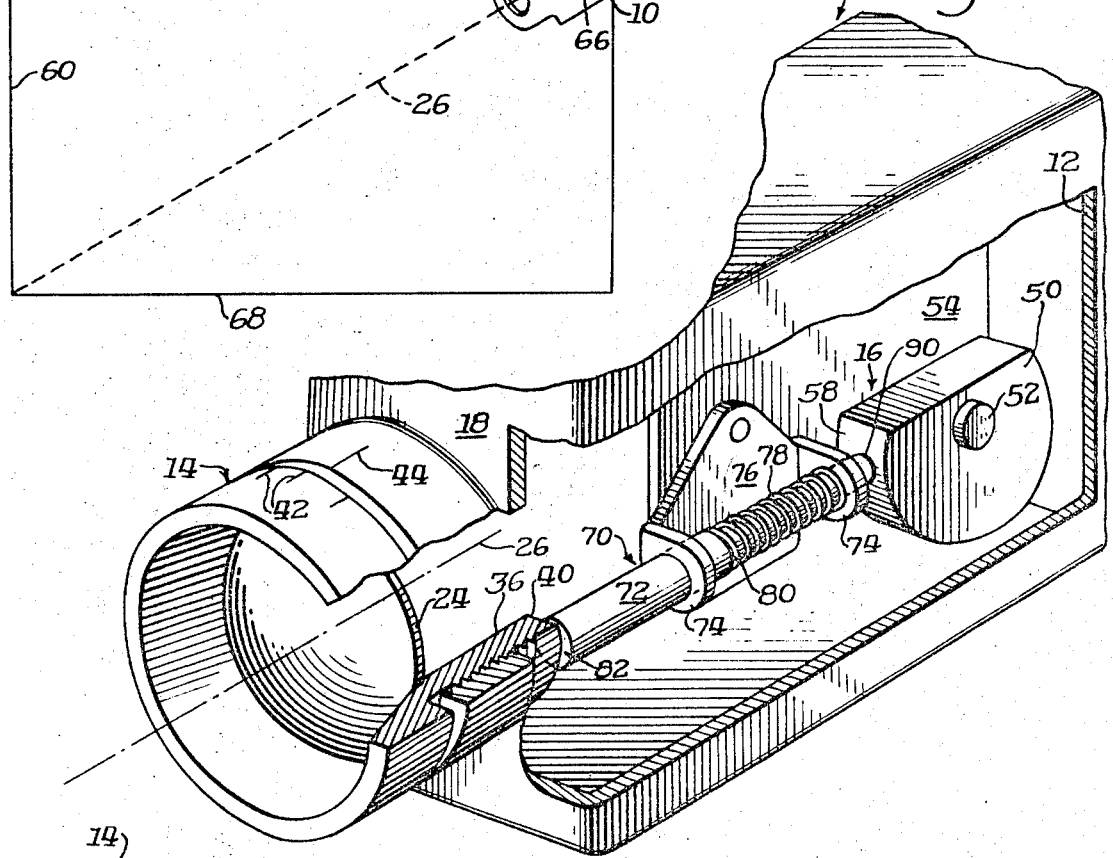
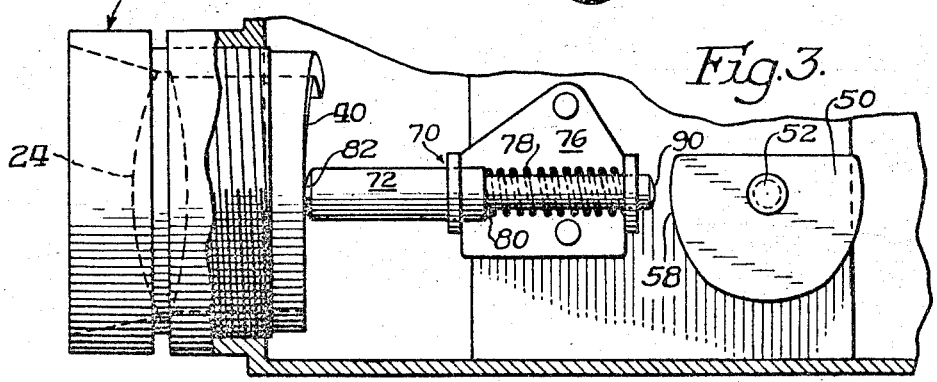
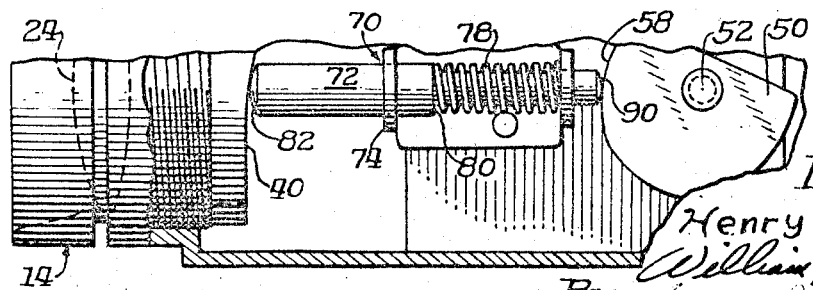
Inventor
Henry J. Koeber Jr
By William L. Smith
Attys

CAMERA FOCUSING MECHANISM USING TRIANGULATION PRICIPLE

The present invention relates to a camera focusing mechanism. Particularly, it relates to a focusing mechanism for a camera, the objective lens of which is adjustable according to focal distances which are determined by a range finder based upon the principle of triangulation.

Triangulation is a procedure predicated on the concept that from a picture-taking or scene-focusing station at some level above the base of a subject, the distance to the subject (focal distance) is a function of the angle to the base of the subject. The principle is readily appreciated by imagining a right triangle wherein from a camera held at eye level, a vertical line extends to a point directly below the camera. A base line of the triangle extends between the point below the camera and the base of a subject to be photographed. This line should be effectively horizontal. The hypotenuse or angled line of the triangle extends between the juncture of the vertical line with the optical axis of the camera to the base of the subject. By the triangulation principle, the angles at the juncture of the base line and the hypotenuse, and at the camera between the hypotenuse and the vertical line, vary according to the distance from the vertical line to the juncture of the base line and the hypotenuse. Thus, the varying angular relation may be used to determine the length of the base line. This information may then be mechanically converted into camera focus distance.

A range finder device employing this principle of triangulation may have a mechanical converter comprising a pendulous member, the relative angular condition of which with respect to its camera corresponds to the focal distance. Such relative angular condition is achieved by rotating the camera at a scene focusing station to a condition at which the base of the subject can be viewed through sighting means associated with the camera. For each focal distance, the objective of the camera has an optimum spacing from its film plane (the "in-focus" position) at which its focal plane and film plane coincide. Thus, the optimum spacing may be determined by cooperation between the objective lens and the pendulous member defining the angle to which the camera is conditioned for scene focusing.

A large percentage of the users of today's photographic equipment are so called "home users" as opposed to amateurs and professionals. The main subject in a large percentage of the scenes photographed by these home users is a person. Of the remaining subjects, most are relatively fixed in space during the time the user composes the picture and exposes the film. Further, the users for the most part are adults between 5 and 6 feet in height. Since the above "constants" exist, a simple and economical triangulation mechanism can be designed to provide a focusing device for this average home user.

A mechanism for setting an objective lens "in-focus" according to each angular position of a pendulous member of a range finder is disclosed in U.S. Pat. No. 1,258,459. That focusing mechanism, however, is not adapted for contemporary cameras in which externally located movable components are not desirable. Further, the several manipulations required of the user to focus the camera's lens are not desirable. Also, that mechanism is not adapted for use in the very limited space available for such a mechanism in today's cameras, which are usually as compact as the functioning mechanisms permit.

Thus, it is an object of the present invention to provide an improved focusing mechanism for a camera using the principle of triangulation.

It is a further object of the invention to provide a new mechanism for focusing a camera by triangulation.

It is another object of the invention to adapt a focusing mechanism comprising a pendulous range finder for a camera having a focusable objective lens.

It is yet another object of the invention to provide a self-locking pendulous system wherein adjustment of the lens causes that lens to be focused on a subject.

The features in a camera for effecting the foregoing objects comprise an objective lens assembly including a lens which is adjustable for focusing a subject in a focal plane, and a pendulous member mounted in said camera for relative movement to any of a plurality of positions corresponding to the angular disposition of the optical axis of the lens with respect to a subject. Also provided is sighting means for viewing a subject for setting the optical axis at an angle corresponding to focal distance. Spacer means are mounted in bearing association with said objective lens assembly for limiting movement of the lens along the optical axis relative to the pendulous member at lens-focusing condition, and means are provided for adjusting the objective lens assembly relative to the spacer means for focusing adjustment of the lens longitudinally of said optical axis.

Further and other objects will be apparent from the description of the accompanying drawings in which like numerals refer to like parts.

In the drawings:

FIG. 1 is a perspective view of a camera shown schematically, with parts broken away and parts omitted, and illustrating one embodiment of the invention;

FIG. 2 is a schematic illustration of the range finding procedure according to this invention;

FIG. 3 is a side-elevational view of the embodiment illustrating a pendulous member in free swinging condition in said camera; and FIG. 4 is a view of the embodiment of FIG. 3 illustrating the pendulous member in locked condition.

Referring now to FIG. 1, there is shown a camera 10 comprising a housing 12 supporting an objective lens assembly 14 and an objective lens-focusing mechanism 16. Housing 12, when oriented as in the drawings, includes a front wall 18 in which the objective lens assembly is supported so that the assembly, containing a focusable lens element 24, defines an optical axis 26 fixed relative to the housing. Through a rear wall 30 (shown only in FIG. 2) is a subject sighting opening 34 through which the subject can be viewed either through objective lens assembly 14 or another opening (not shown) in front wall 18. Lens elements of objective lens assembly 14 are aligned and supported in a barrel 36 having a formed surface 40 interior of housing 12. This surface extends over a part of the annulus of the barrel and may be configured as a plane or as a cam such as is shown in FIG. 3.

The objective lens assembly 14 is adjustable along optical axis 26 wherein the focal plane defined by objective lens 24 can be made to coincide with a film plane (not shown) in the housing 12. Adjustment of the objective assembly to an "in-focus" condition is to be understood to result from axial movement of the objective lens to make the focal plane and the film plane coincide. To accomplish the axial movement required for the present invention the objective lens-supporting barrel 36 may be either rotated on a spiral thread or otherwise moved axially with respect to housing 12. In an objective lens assembly in which the focusing element is moved internally of the barrel without physical displacement of the barrel along the optical axis, a cam surface may be provided on the barrel internally of the camera housing to effectively translate axial movement of the focusable lens element 24 for cooperation with the focusing mechanism of the camera. The preferred embodiment of this disclosure includes a spirally rotatable, axially adjustable objective lens assembly having a surface 40, internally of the camera housing, formed as a cam. Objective lens 24 of objective lens assembly 14 can be adjusted to "in-focus" condition upon application of manual rotational torque to barrel 36 in order to cause the required movement of the lens element longitudinally of the optical axis between an "out-of-focus" position and the "in-focus" position. For each focal distance of a subject relative to the objective lens the objective lens has an "in-focus" position longitudinally of its optical axis. Accordingly, the objective lens must be adjusted, within relatively critical limits, to the particular position which will provide a well focused picture for a given focal distance. A scale 42 on barrel 36, when adjusted relative to an index mark 44, denotes predetermined "in-focus" positions of the objective lens.

Focusing mechanism 16 obviates the requirement for estimating or separately measuring the focal distance to which the objective lens is to be adjusted. The mechanism comprises a pendulous member 50 adapted to swing freely independent of housing 12 and the objective lens assembly 14. The pendulous member can rock or swing about an axle 52 supported in a mechanism plate 54 within housing 12. Axle 52 defines an axis extending transversely of optical axis 26. Pendulous member 50, in this embodiment, is semidisc-shaped with an exterior or peripheral cam surface 58 fashioned so that objective lens 24 will be "in-focus" at any predetermined position of the pendulous member. The objective lens is fixed relative to that cam surface insofar as the focal distance of a subject 60 (see FIG. 2) corresponds to the relative angular disposition of pendulous member 50.

Focusing by using the pendulous member may be understood with reference to FIG. 2 in which camera 10 includes sighting means 34. The sighting means of this preferred embodiment includes objective lens 24, image deflecting mirrors 64 and a viewing screen 66 which receives the image of the scene being viewed from the second mirror. While sighting, camera 10 and its optical axis 26 are displaceable from normal picture taking aspect (dotted line) to scene focusing or range finding aspect (solid line) to sight the base of subject 60. With this displacement, pendulous member 50, which is in free-swinging condition relative to the housing and optical axis, will rotate relative thereto. When camera displacement is complete, pendulous member 50 assumes a predetermined position influenced by gravity. That is, regardless of the orientation of housing 12, the pendulous member seeks a gravity induced position. This position is significant because the focal distance varies according to the angle from the picture-taking position to the base of the subject. Accordingly, free-swinging pendulous member 50 can be made to assume an aspect relative to the housing which is a function of the focal distance.

It is recognized that for any given focal distance, the angle at the juncture of the hypotenuse line and the base line of a right triangle will vary according to the length of the vertical line. Since the height of the scene-focusing position above a base 68 defines the length of the vertical line, an error factor may be introduced if the scene-focusing position is above or below an intended height relative to the base for which the cam surface of the pendulous member is designed. However, this fact can be ignored as long as the scene focusing position is at about the same level relative to the subject's base for each picture. In this preferred embodiment, the cam surface 58 of the pendulous member 50 has been designed for eye level of a user considered to be of average height. In using this triangulation mechanism for focusing at relatively long distances from the camera, the error factor introduced by a user being taller or shorter than the "average" is compensated for by the ever increasing depth of the focus of the camera objective lens as the focal distance of that objective lens increases. When the taller or shorter user focuses the camera objective lens on a nearby subject where depth of focus is relatively shallow, however, the amount of error is proportionately decreased. Thus, as for a cam such as is disclosed herein computed for eye-level use of a user 5 feet 8 inches in height, experiments have shown that taller and shorter users obtained well focused pictures with a mechanism incorporating the same cam. Of course, if the camera is of the waist level view-finding type, the cam would be designed for the average height at which the camera would then be held rather than for eye-level.

A transfer member 70 forms a link to enable the objective lens assembly to be adjusted at a fixed spacial relationship to the aspect of the cam surface of pendulous member 50, and to stop it in this "in-focus" position a fixed distance from cam surface 58. This transfer means 70 comprises a spacer rod 72 which is disposed parallel to the optical axis and transversely of the rotational axis 52 of pendulous member 50. Spacer rod 72 has a supported portion (FIG. 1) which is slidable axially in a pair of ears 74 fashioned on bracket 76. A biasing spring 78, bears against one of ears 74 and a shoulder 80 of the forward bearing end portion 82 of rod 72. This spring urges rod 72 axially so that end portion 82 is in bearing engagement with the relatively movable rear surface 40 of the objective lens assembly's annular extension barrel 36. Spring 78 surrounds a reduced portion of rod 72 which ends in a bearing portion 90 which may engage the pendulous member 50. When objective lens 24 is "out-of-focus", spacer rod 72 is spaced from pendulous member 50, thereby permitting adjustment of the objective lens. The pendulous member and the parts are fashioned and proportioned, however, so that when spacer rod 72, which is independent of either of the parts with which it cooperates, is moved into engagement with the pendulous member 50 by axial adjustment of objective lens assembly 14 as above described, objective lens 24 is set in its "in-focus" position. That is, rear surface 40 of lens assembly 14 can move spacer rod 72 axially against the urging of spring 78 until the rod engages the pendulous member. As earlier noted, for obtaining focusing in a most efficient manner, rear bearing surface 40 may be planar although it is shown as cam shaped.

Transfer member 72 is mounted for reciprocation radially of axle 52 supporting pendulous member 50. Upon being driven into engagement with the cam surface 58 of the pendulous member, spacer rod 72 tends to lock the member against free rotation, thereby permitting the camera to be moved as desired for the necessary composing of the scene to be photographed. This self-locking feature is obtained by the force of the spacer rod being directed through axle 52 as a single line of force. Should the force be applied above or below the axle, the force of the rod would be resolved into two lines of force, one of which would not pass through the axle and would therefore be a rotary component to urge the pendulous member rotatably around the axis. Since cam surface 58 defines the angle and the focal distance, rotation of the member is obviously undesirable. Hence, the ability of the transfer member to lock the pendulous member against undesired rotation is quite desirable.

To release pendulous member 50 for adjustment to another position when a change of the focus of the objective lens is desired, objective lens 24 is adjusted to a predetermined position which may be slightly beyond one end of the focusing range of the objective lens. At this position, the spacer rod 72 becomes spaced from the cam surface of the pendulous member under the urging of spring 78. So long as this clearance exists, the pendulous member 50 is free to pivot relative to the camera. When the base of the subject is sighted, adjustment of the objective lens moves spacer rod 72 into locking engagement with the pendulous member 50 locking that member in place. Simultaneously, objective lens 24 is brought into focus on the subject. To refocus the objective lens on yet another subject, these steps need only be repeated.

It is to be understood that the embodiment shown is illustrative of the principal of operation of a focusing mechanism which ensures proper focus of a camera lens and that certain changes, alterations, modifications, or substitutions can be made in the structure of the device without departing from the spirit and scope of the claims.

I claim:

1. Improvements in a focusing arrangement for a camera having an adjustable objective assembly including a lens defining an optical axis and being adjustable for focusing on a subject, and a lens barrel having a predetermined surface interiorly of the camera, a sighting means for viewing a subject for setting said optical axis at an angle corresponding to focal distance, and a pendulous member mounted for rocking movement relative to said camera to any of a plurality of positions corresponding to the angular disposition of the optical axis of said lens with respect to a subject to be photographed, the improvement comprising: a cam surface on said pendulous member defining varying radial distances relative to the objective lens; spacer means mounted for bearing association between said cam surface of said pendulous member and said surface of said lens barrel for limiting movement of said lens along said optical axis relative to said pendulous member, said spacer means having a predetermined length wherein when said lens is adjusted so that said surface of said lens barrel engages said spacer means when said spacer means is engaged and adjusted by said cam surface, said lens is focused on a subject.

2. The improvements in a focusing arrangement, as in claim 1 wherein the rocking pendulous member is mounted for movement, about a pivot and the spacer means extends substantially radially of the pivot of said pendulous member to cooperate therewith in a self-locking manner.

3. A combination according to claim 1 in which said spacing means comprises a rod having an end portion for bearing engagement with said objective assembly and disposed parallel to said optical axis for movement into engagement with said pendulous member upon movement of said lens from an unfocused to a focused condition.

4. A combination according to claim 3 further characterized by a bracket for supporting said rod for axial movement into and out of engagement with said pendulous member, and means for biasing said rod end portion into engagement with said objective assembly.

5. In a camera having an adjustable objective assembly including a lens for focusing on a subject, and a lens barrel having a predetermined surface interiorly of the camera, a sighting means for viewing a subject for setting said optical axis at an angle corresponding to focal distance, and a pendulous member mounted for movement relative to said camera to any of a plurality of positions corresponding to the angular disposition of the optical axis of said lens with respect to a subject to be photographed for adjusting the spacing between said lens and said pendulous member, the combination comprising: spacer means having a predetermined length and being mounted independently in said housing for adjustment relative to said pendulum into bearing association with said annular surface of said lens barrel for limiting movement of said lens along said optical axis relative to said pendulum member wherein when said spacer means engages said surface of said lens barrel, said lens is in focused condition.

6. A combination according to claim 5 in which said spacing means comprises a rod having an end portion for bearing engagement with said objective lens assembly and disposed parallel to said optical axis for movement into engagement with said objective lens assembly and disposed parallel to said optical axis for movement into engagement with said pendulous member upon movement of said lens from an unfocused to a focused condition.

7. A combination according to claim 6 further characterized by a bracket for supporting said rod for axial movement into and out of engagement with said pendulous member, and means for biasing said rod end portion into engagement with said objective lens assembly.

8. A combination according to claim 5 wherein the pendulous member is rockable about a pivot and the spacer means extends substantially radially of the pivot of said pendulous member to cooperate with said member in a self-locking manner.